United States Patent [19]
Wittstock et al.

[11] Patent Number: 5,891,488
[45] Date of Patent: Apr. 6, 1999

[54] MOLD CLOSING DEVICE WITHOUT CROSSBEAM FOR INJECTION MOLDING MACHINE

[75] Inventors: Volker Wittstock; Klaus Füller, both of Schwerin, Germany

[73] Assignee: Hemscheidt Maschinentechnik Schwerin GmbH & Co., Schwerin, Germany

[21] Appl. No.: 717,700

[22] Filed: Sep. 23, 1996

[30] Foreign Application Priority Data

Sep. 23, 1995 [DE] Germany ................. 195 35 436.2

[51] Int. Cl.⁶ ................. B28B 1/24; B29C 45/64
[52] U.S. Cl. ................. 425/589; 425/451; 425/451.9; 100/258 A
[58] Field of Search ................. 425/589, 595, 425/451.9, 590, 591, 592, 450.1, 451, 451.2; 100/258 A

[56] References Cited

U.S. PATENT DOCUMENTS

| | | | |
|---|---|---|---|
| 5,249,951 | 10/1993 | Leonhartsberger et al. | 425/589 |
| 5,556,656 | 9/1996 | Lampl et al. | 425/589 |
| 5,650,182 | 7/1997 | Fuller et al. | 425/589 |

FOREIGN PATENT DOCUMENTS

| | | |
|---|---|---|
| 44 20 639 C1 | 9/1995 | Germany. |
| 195 01 469 A1 | 7/1996 | Germany. |

*Primary Examiner*—Richard L. Chiesa
*Assistant Examiner*—Robert Hopkins
*Attorney, Agent, or Firm*—Darby & Darby

[57] ABSTRACT

The invention relates to a mold closing device without cross-beam for an injection molding machine having a C-shaped machine frame, a fixed tool mounting plate supported therein and an end plate, as well as a movable tool mounting plate longitudinally movable on antifriction guideways and guide bars. It is the object of the invention to provide an inexpensive and simple adjustment which assures the concentricity between the fixed tool mounting plate and the end plate during deformation of the machine frame as a result of the closing force and which eliminates the machining tolerances among the hinge points on the guide bars. The solution provides that the guide bars are horizontally frictionally attached to the machine frame, are vertically biasable via springs against the fixed tool mounting plate and against the end plate, and are supportable via springs between the end plate and the fixed tool mounting plate.

10 Claims, 4 Drawing Sheets

MOLD CLOSING DEVICE WITHOUT CROSSBEAM FOR INJECTION MOLDING MACHINE

BACKGROUND OF THE INVENTION

1. Field of the Invention

The invention relates to a mold closing device without cross-beam for an injection molding machine, consisting of a C-shaped machine frame, wherein a fixed tool mounting plate is disposed on one of the legs of the frame and an end plate is disposed on the other leg of the frame. Between these plates, a movable tool mounting plate is longitudinally movable on guides against the fixed tool mounting plate parallel to an injection molding axis by means of a hydraulic closing cylinder. The hydraulic closing cylinder is supported by the end plate and connected to the movable tool mounting plate via the piston rod. The fixed and the movable tool mounting plates are provided with clamping surfaces which are oriented perpendicularly to the injection molding axis, for accepting the die halves of a form tool. The closing and opening force created by the hydraulic closing cylinder during the injection and opening process is absorbed by the machine frame, wherein the antifriction guideways consist of guide bars which are attached to the machine frame, and of roller bearings attached to the movable tool mounting plate.

2. Description of the Related Art

A solution is described in DE 4420639 C1 where the movable tool mounting plate is horizontally supported by rollers along two axes in a spaced relationship, wherein the rollers are movable on and supported by guide bars. Another older solution of a similar type is known for the patent application 19501469.3 where the fixed tool mounting plate is biaxially supported a leg of the machine frame. In this solution, the end plate is rigidly connected to the leg of the machine frame. In DE 4420639 C1, on the other hand, both the end plate and the fixed tool mounting plate are each biaxially supported by the legs of the machine frame. It is also known from the two older solutions that the ends of the guide bars are fastened to the machine frame.

SUMMARY OF THE INVENTION

Since the fixed tool mounting plate and the end plate are also attached to the machine frame, deviations from parallelism and concentricity occur as a result of dimensional imperfections induced by machining. This holds especially true for the parallel displacement between the guide bars and the injection molding axis and for the deviation from concentricity between the injection molding axis and the axis of the closing cylinder. A further problem arises from machining tolerances of the hinge points on the machine frame and on the guide bars, since the guide bars are supported at their end points. It is the object of the invention to provide an inexpensive and simple adjustment for a mold closing device without cross-beam for an injection molding machine which assures the concentricity between the fixed tool mounting plate and the end plate during deformation of the machine frame as a result of the closing force and which eliminates the machining tolerances among the hinge points on the guide bars. The object of the invention is accomplished in that the guide bars are frictionally attached to the machine frame in a horizontal direction, are vertically springably biasable against both the fixed tool mounting plate and the end plate, and are springably supportable between the end plate and the fixed tool mounting plate. In a mold closing device without cross-beam of this type where the fixed tool mounting plate is biaxially supported in the machine frame and where the end plate is rigidly affixed to the machine frame, the fixed tool mounting plate is in addition frictionally attached to one of the two guide bars or to the machine frame in a horizontal direction perpendicular to the injection molding axis. In another embodiment of the invention, an internal lubricant is provided at the contact surfaces between the guide bars and the fixed tool mounting plate, the end plate and the machine frame.

The inventive solution has the advantage that the fabrication and installation dependent deviations in the parallelism between the guide bars and the injection molding axis and the deviations in the concentricity between the injection molding axis and the axis of the closing cylinder can be minimized. It is a further advantage of the invention that as a result of the frictional engagement between the guide bars and the machine frame, the hinge points themselves and the expenses associated with their fabrication have been eliminated. Furthermore, the guide bars can be easily and accurately adjusted since the hinge points have been eliminated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PRESENTLY PREFERRED EMBODIMENTS

Figure 1:
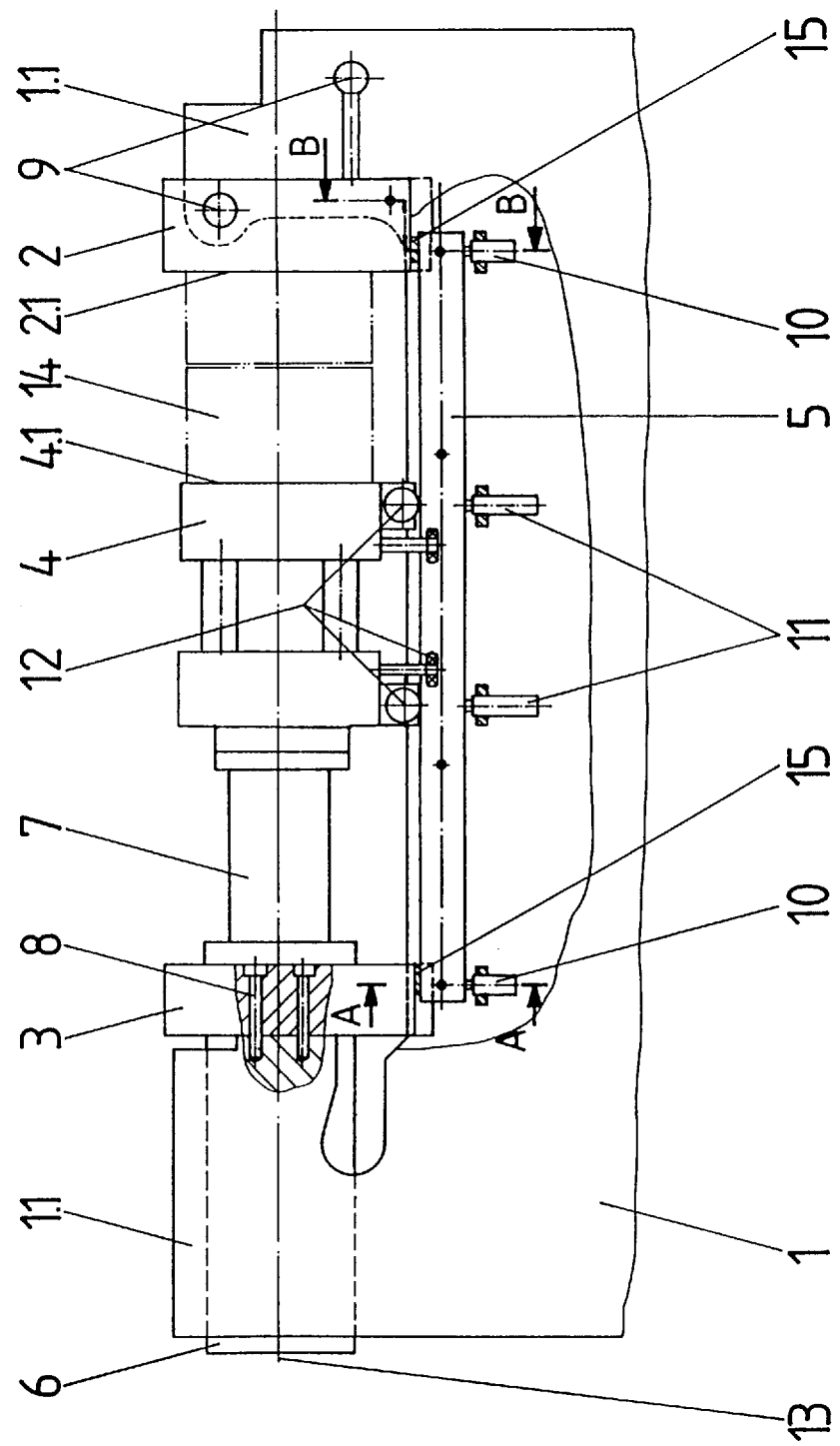
FIG. 1 full view of a mold closing device without cross-beam.

The mold closing device without cross-beam shown in FIG. 1 comprises a C-shaped machine frame 1, where a fixed tool mounting plate 2 is supported by one of the legs 1.1 of the frame 1 by two bearing axes 9. The end plate 3 is attached to the other leg 1.1 of the machine frame 1 via a screw connection 8. Therebetween, a movable tool mounting plate 4 is movable against the fixed tool mounting plate 2 on antifriction guideways 12 along an injection molding axis 13. The travel mechanism consists of a closing cylinder 6 which is supported by the end plate 3 and connected to the movable tool mounting plate 4 via the piston rod 7.

Figure 2:
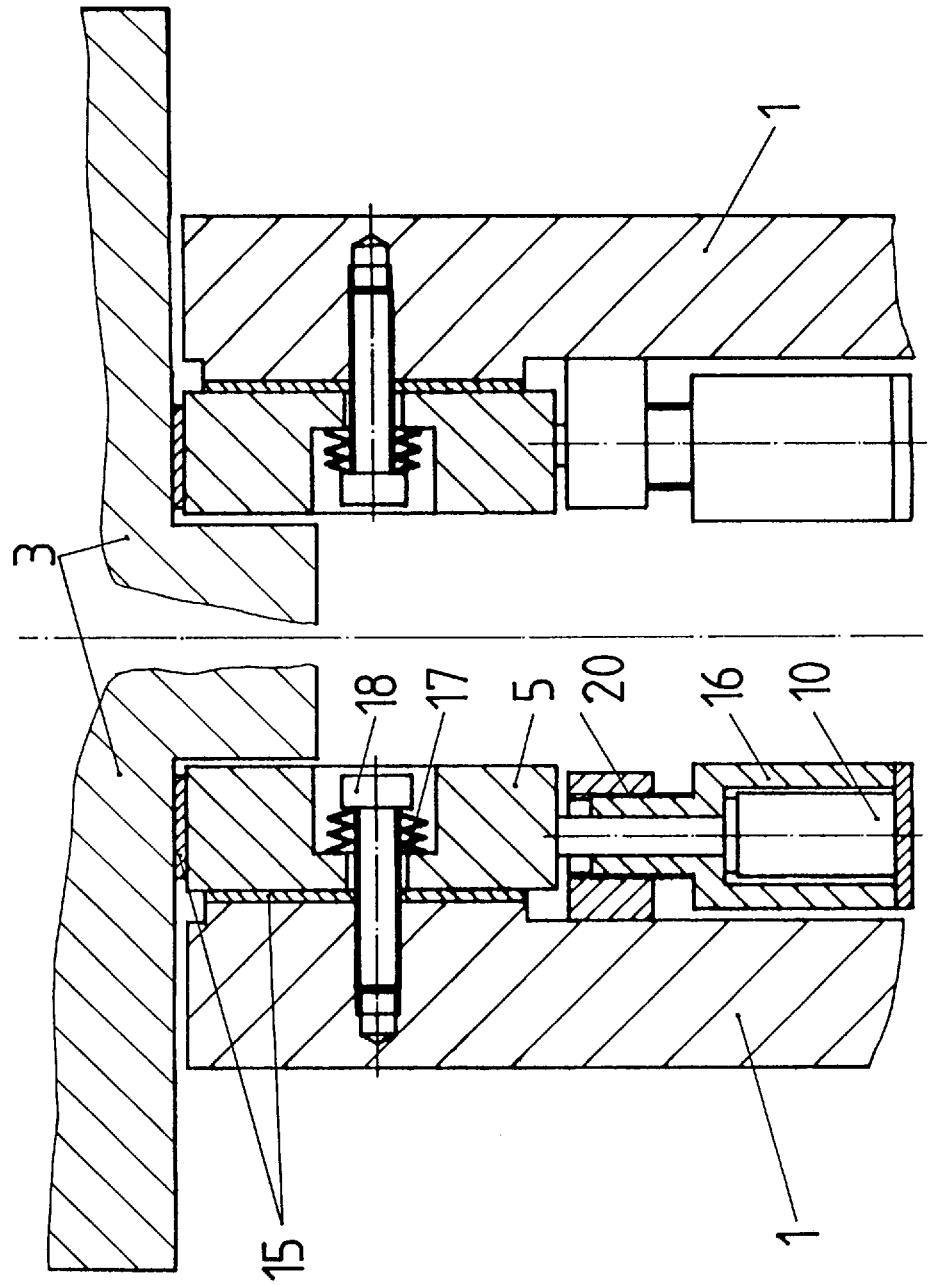
FIG. 2 cross-sectional view of the machine frame and the fixed tool mounting plate along the line A—A in FIG. 1.

Both tool mounting plates 2 and 4 are provided with clamping surfaces 2.1 and 4.1 which are oriented perpendicular to the injection molding axis 13, for accepting the ejector and cover dies of a form tool 14. The closing and opening force which is generated during the closing and opening process, is absorbed by the machine frame 1. According to the invention, the guide bars 5 are frictionally attached to the machine frame 1 in a horizontal direction. In the embodiment, the guide bars 5 are preferably affixed to the inside of the machine frame 1. According to FIG. 2, the frictional connection consists of an internal lubricant 15, springs 17 and a screw connection 18, whereby the guide bars 5 are biasable against the machine frame 1. The friction force can be adjusted via the screw connection 18. In addition, the guide bars 5 are vertically biasable via springs 10 against the fixed tool mounting plate 2 and against the end plate 3. Internal lubricant 15 is disposed between the fixed tool mounting plate 2 and the end plate 3, respectively, and the guide bars 5, whereby horizontal displacement of the fixed tool mounting plate 2 and the end plate 3 relative to the guide bars 5 is enabled upon application of the closing force. Springs 11 are provided in the travel zone of the movable tool mounting plate 4 as additional support for the guide bars 5 and for adjusting the parallelism between the guide bars 5 and the injection molding axis 13.

Figure 3:
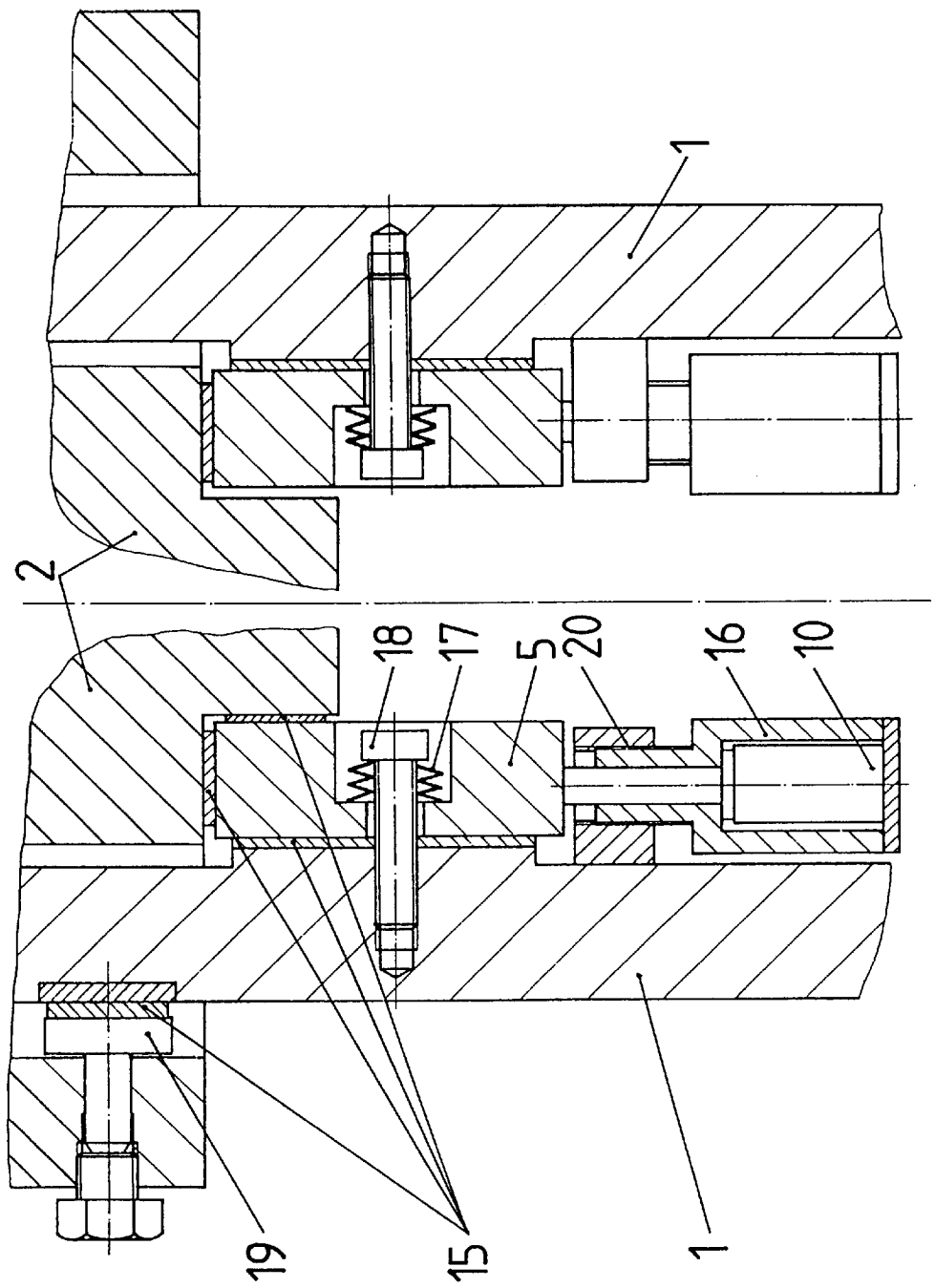
FIG. 3 cross-sectional view of the machine frame and the end plate along the line B—B in FIG. 1.

FIG. 3 shows the cross-sectional view along the line B—B in FIG. 1 with the biaxial support of the fixed tool mounting plate 2. In this arrangement, the fixed tool mounting plate 2 is on one side horizontally biased against the guide bar 5 by way of a pressing piece 19. Once more, internal lubricant 15 is provided at the pressing points. This arrangement prevents that the support of the fixed tool mounting plate 2 is overdetermined.

Figure 4:
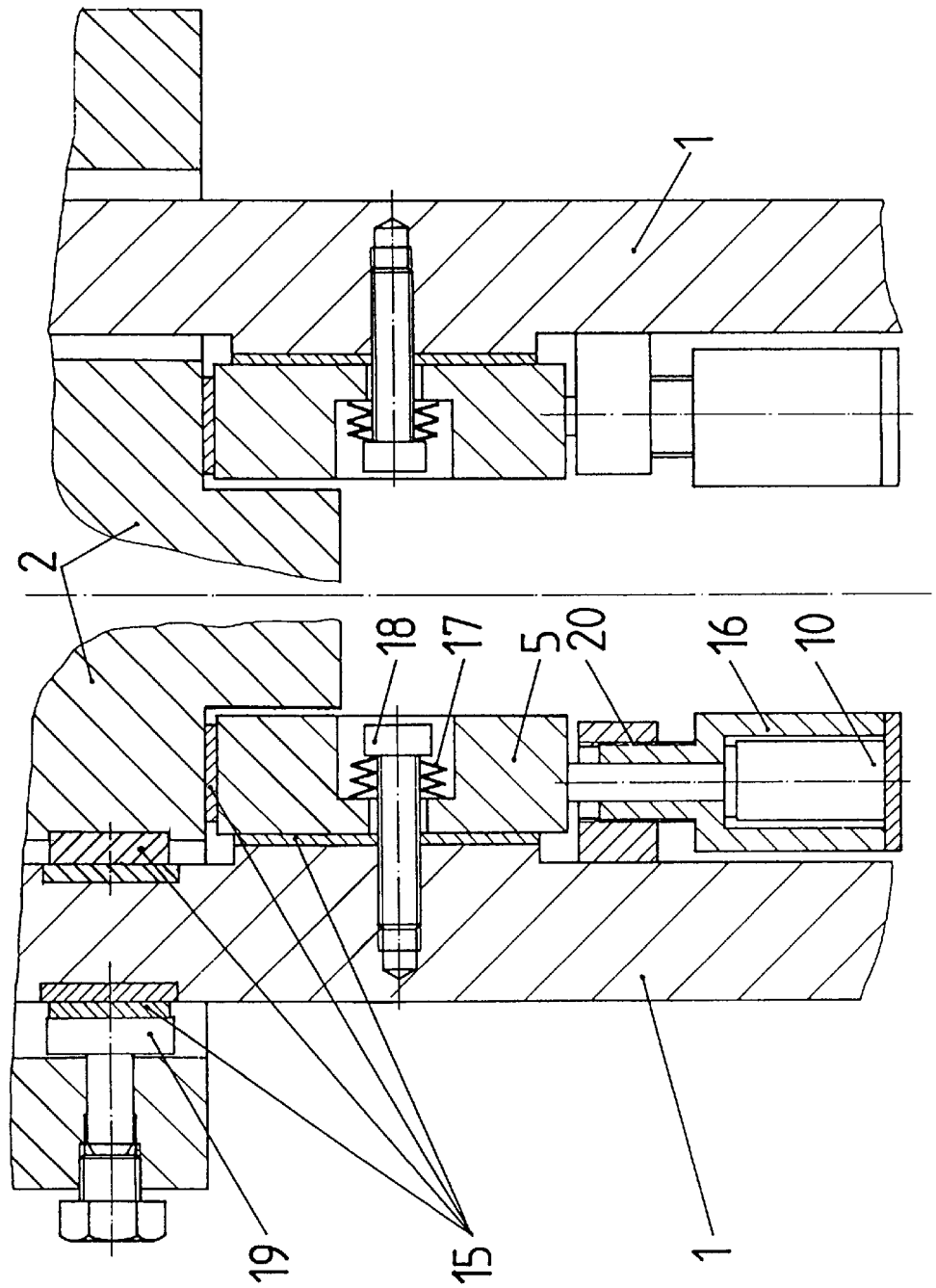
FIG. 4 a different embodiment according to FIG. 3.

In FIG. 4, as opposed to FIG. 3, the fixed tool mounting plate 2 is horizontally attached to the machine frame 1 and not to the guide bars 5.

The internal lubricant 15 disposed between the friction points minimizes the mechanical wear at all friction points induced by the closing force, thereby providing a longer lifetime of all guiding elements of the mold closing device. It is also evident from FIG. 2 that the springs 10 and 11 are preloaded inside a sleeve 16. In addition, the height of the sleeve 16 can be adjusted via a thread 20.

The springs 10 and 11 differ in their allowed displacement and the different spring tension resulting therefrom. The proposed solution produces the favorable situation, in that the movable tool mounting plate 4 is biased during its entire travel in such a way that it is always parallel to the fixed tool mounting plate 2.

The invention is not limited by the embodiments described above which are presented as examples only but can be modified in various ways within the scope of protection defined by the appended patent claims.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A mold closing device without cross-beam for an injection molding machine, comprising:

a C-shaped machine frame forming a first and a second leg, a fixed tool mounting plate is disposed on the first leg, an end plate is disposed on the second leg, a tool mounting plate is movably disposed on antifriction guideways between the first and the second leg, the tool mounting plate is movable against the fixed tool mounting plate parallel to an injection molding axis by means of a hydraulic closing cylinder, the cylinder is supported by the end plate and connected to the movable tool mounting plate via a cylinder piston rod, the fixed mounting plate and the movable tool mounting plate are provided with clamping surfaces which are oriented perpendicularly to the injection molding axis, for accepting die halves of a foam tool, the antifriction guideways include guide bars attached to the machine frame and roller bearings attached to the movable tool mounting plate, wherein the guide bars are horizontally frictionally attached to the machine frame by adjustable friction means, and wherein the guide bars are vertically biasable via first springs positioned substantially against the fixed tool mounting plate and against the end plate, and wherein the guide bars are supportable between the end plate and the fixed tool mounting plate via second springs.

2. The mold closing device without cross-beam according to claim 1, having a fixed tool mounting plate biaxially supported in the machine frame and an end plate rigidly affixed to the machine frame, wherein the fixed tool mounting plate is frictionally attached in its horizontal direction perpendicular to the injection molding axis to one of the two guide bars.

3. The mold closing device without cross-beam according to claim 1, having a fixed tool mounting plate biaxially supported in the machine frame and an end plate rigidly supported by the machine frame, wherein the fixed tool mounting plate is frictionally attached in its horizontal direction perpendicular to the injection molding axis to one side of the machine frame.

4. The mold closing device without cross-beam according to claim 1, further comprising an internal lubricant disposed on the contact surfaces between the guide bars, the fixed tool mounting plate, the end plate and the machine frame.

5. The mold closing device of claim 4 wherein the adjustable friction means includes:

an adjustable screw engagement between the guide bars and the machine frame; and the internal lubricant.

6. The mold closing device of claim 5 wherein the machine frame is connected to the hydraulic closing cylinder, wherein the machine frame absorbs the closing and opening forces generated by the hydraulic closing cylinder.

7. A mold closing device without cross-beam for an injection molding machine, comprising:

a C-shaped machine frame forming a first and a second leg;

a fixed tool mounting plate disposed on the first leg;

an end plate disposed on the second leg;

a plurality of antifriction guideways;

a tool mounting plate movably disposed on the antifriction guideways between the first and the second leg, the tool mounting plate being movable against the fixed tool mounting plate parallel to an injection molding axis;

a hydraulic closing cylinder for moving the tool mounting plate against the fixed tool mounting plate, the hydraulic closing cylinder being supported by the end plate and connected to the movable tool mounting plate via a cylinder piston rod;

wherein each of the fixed mounting plate and the movable tool mounting plate have clamping surfaces which are oriented perpendicularly to the injection molding axis, for accepting die halves of a foam tool;

wherein the antifriction guideways include guide bars attached to the machine frame and roller bearings attached to the movable tool mounting plate;

wherein the guide bars are horizontally frictionally attached to the machine frame by adjustable friction means, wherein the guide bars are vertically biasable via springs against the fixed tool mounting plate and against the end plate, and wherein the guide bars are supported between the end plate and the fixed tool mounting plate via springs; and wherein the hydraulic closing cylinder is adapted for generating closing and opening forces during the injection and opening process, respectively.

8. The mold closing device of claim 7 wherein the adjustable friction means includes:

an adjustable screw engagement between the guide bars and the machine frame; and a lubricant disposed in a region internally located between the guide bars.

9. A mold closing device without cross-beam for an injection molding machine, comprising:

a C-shaped machine frame forming a first and a second leg;

a fixed tool mounting plate disposed on the first leg;

an end plate disposed on the second leg;

a plurality of antifriction guideways;

a tool mounting plate movably disposed on the antifriction guideways between the first and the second leg, the tool mounting plate being movable against the fixed tool mounting plate parallel to an injection molding axis;

a hydraulic closing cylinder for moving the tool mounting plate against the fixed tool mounting plate, the hydraulic closing cylinder being supported by the end plate and connected to the movable tool mounting plate via a cylinder piston rod;

wherein each of the fixed mounting plate and the movable tool mounting plate have clamping surfaces which are oriented perpendicularly to the injection molding axis, for accepting die halves of a foam tool;

wherein the antifriction guideways include guide bars attached to the machine frame and roller bearings attached to the movable tool mounting plate;

wherein the guide bars are horizontally frictionally attached to the machine frame, wherein the guide bars are vertically biasable via springs against the fixed tool mounting plate and against the end plate, and wherein the guide bars are supported between the end plate and the fixed tool mounting plate via springs; and wherein the hydraulic closing cylinder is adapted for generating closing and opening forces during the injection and opening process, respectively.

10. The mold closing device of claim 9 further comprising:

adjustable friction means for frictionally securing the guide bars to the machine frame.

* * * * *